Sept. 26, 1961   R. J. LORRIG ET AL   3,002,146
REMOTE CAPACITOR SWITCHING SYSTEM
Filed Oct. 13, 1958   2 Sheets-Sheet 1

INVENTOR.
Robert J. Lorrig
Charles Keith Stenerson
BY
Mueller & Aichele
Attys.

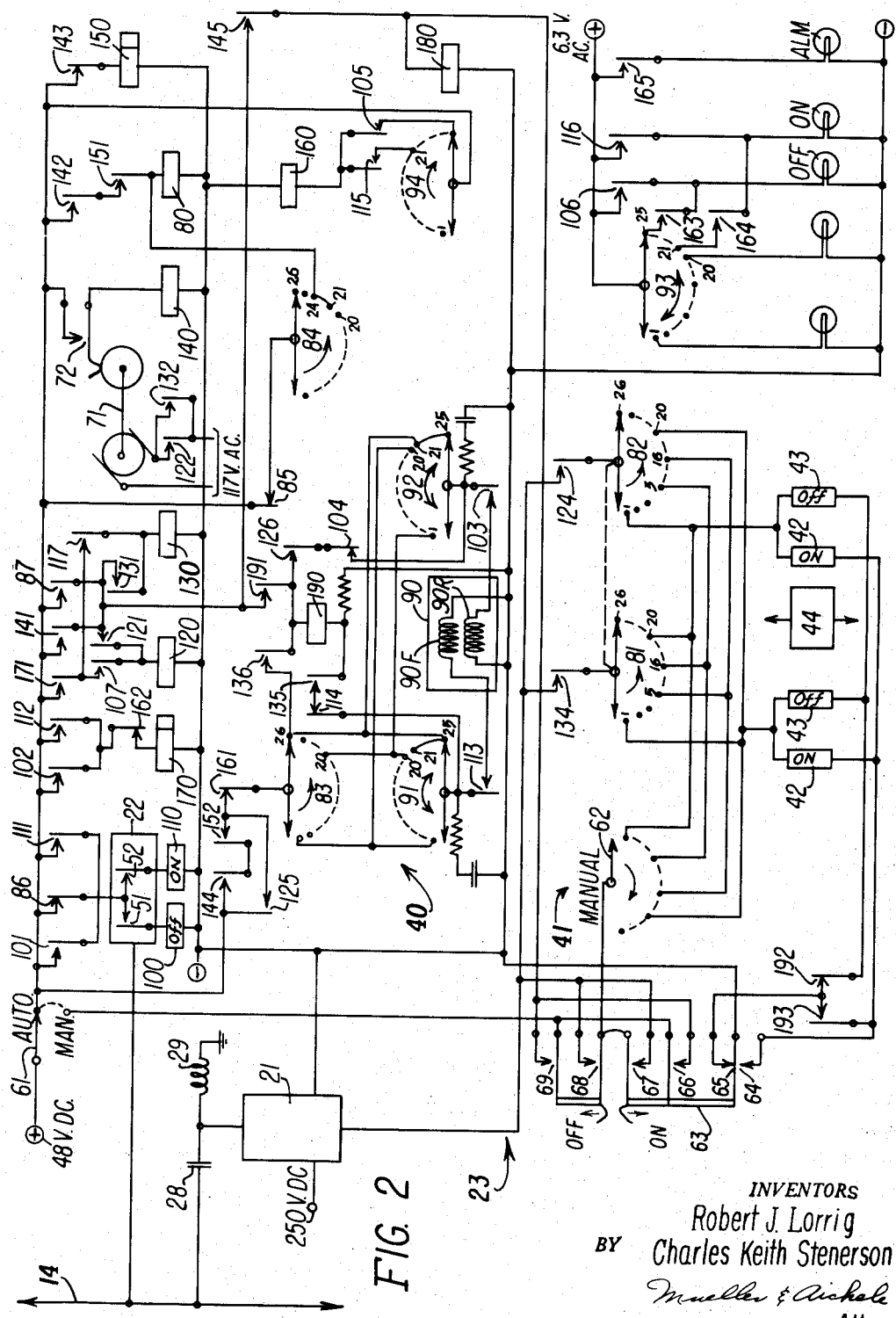

United States Patent Office 3,002,146
Patented Sept. 26, 1961

3,002,146
REMOTE CAPACITOR SWITCHING SYSTEM
Robert J. Lorrig, Oak Park, and Charles Keith Stenerson, Park Ridge, Ill., assignors to Motorola, Inc., Chicago, Ill., a corporation of Illinois
Filed Oct. 13, 1958, Ser. No. 766,797
8 Claims. (Cl. 323—105)

This invention relates generally to the control of power distribution systems, and more particularly to a remote control system for selectively controlling the connection of power factor correcting capacitors to power transmission and distribution lines.

It has been found that power distribution systems may be operated with substantial savings in capital investment and expenses by more extensive use of power factor correcting capacitors. In order to obtain full benefit from the use of such line capacitors, the connection of the capacitors must be properly controlled. The capacitors are most effective on feeder lines near the various customer loads, but these may be dispersed at widely separated locations. Previously used devices which provide local switching control for capacitors at a given installation have many drawbacks, particularly where capacitors are to be installed in large numbers on feeder lines.

Recently, there has been proposed a remote capacitor switching system including control units which are installed with the capacitors on the feeder lines and which are selectively responsive to a modulated carrier wave supplied from a central control station to control the connection of the capacitors. The modulation is controlled according to the needs of the system as determined from information available on distribution substations and buses. Such a remote control system can reduce power losses considerably and many increase the capabilities of existing generation facilities sufficiently to defer expensive system additions. Expensive tap-changing equipment on many new transformers can be eliminated, and maintenance of existing tap changing equipment is reduced.

It is an object of the present invention to provide simple and economical apparatus for a remote capacitor switching system which operates reliably and which can be widely applied to different power distribution systems without substantial modification.

Another object of the invention is to provide coding apparatus for the central station of a remote capacitor switching system for supplying "on" and "off" control signals in a sequence determined by load characteristics and which automatically compensates for possible errors in sensing the load to maintain the proper transmitting sequence, and control apparatus for the switching stations of the system for selecting particular "on" and "off" control signals to control the connection of an associated capacitor and for effectively preventing repeated response to successive signals of the same frequency in order to assure compliance with the desired sequence.

A feature of the invention is the provision of a remote capacitor switching system including coding equipment which supplies different control signals representing the "on" and "off" conditions of a plurality of capacitors, with the control signals being sequenced by stepping switches which also act to remember the sequence from one operation to the next, thereby reducing the number of components required and simplifying the wiring thereof.

Another feature of the invention is the provision for a remote capacitor switching system of coding equipment including a pair of stepping switches operating together to scan and apply modulating signals to transmitting apparatus in a controlled sequence, and a relay normally responsive to sensing apparatus to select the modulating signals in a sequence determined by a load characteristic, with the relay being controlled by the stepping switches in case the sensing device gives an incorrect indication of load conditions to maintain a desired sequence.

A further feature of the invention is the provision for a remote capacitor switching system of control apparatus including frequency selective relays responsive to control signals of predetermined frequencies, and a simple switching circuit which is operated by these relays to control the connection of an associated capacitor and which operates to condition only one of the frequency selective relays at a time depending on the existing connection of the capacitor.

The invention is illustrated in the accompanying drawings in which:

FIG. 2 is a circuit diagram for the equipment provided at the central station of the system of FIG. 1.

In practicing the invention a remote switching system is provided including transmitting equipment for applying a modulated carrier wave from a central station through a power distribution system to various switching stations which are each associated with a capacitor on a feeder line. "On" and "off" control signals for each of a plurality of frequency selective control units are supplied to the power lines from the central station in a sequence determined by the load characteristics of the lines. The central station is provided with coding apparatus including a stepping switch which scans and provides signals of one type until the load is corrected and then provides signals of the other type for the remainder of the sequence, so that each switching station receives a signal to assure compliance with the desired schedule. Another stepping switch counts the signals applied before or after the point in the scan at which the load was corrected, and this provides an indication of how many capacitors are on and off the line at any given time. The stepping switches are arranged to prevent a premature change from one type of tone to the other as a result of possible sensing error. This efficient use of the stepping switches substantially simplifies the coding apparatus and reduces the number of expensive components. Similarly, the control units for the switching stations include simple frequency selective circuits which provide reliable switching control with relatively few components.

Figure 1:
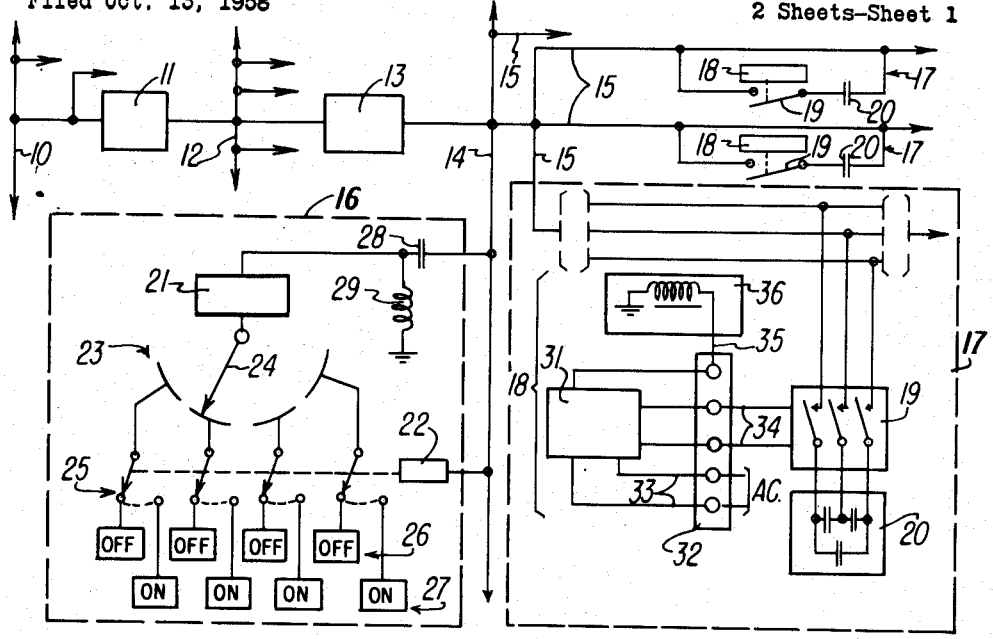
FIG. 1 is a schematic drawing showing a remote capacitor switching system in accordance with the invention.

A power distribution system provided with remote capacitor switching control apparatus in acordance with the invention is shown in FIG. 1. Power is supplied from a main supply bus 10 through a master substation 11 which steps down the voltage to appropriate levels for supplying both industrial and general customers from the bus 12. A distribution substation 13 further steps down the voltage of power which is supplied to customers from the bus 14 over the feeder lines 15. A central control station 16 may be provided at the distribution substation 13, and various switching stations 17 are provided on the feeder lines 15. The switching stations 17 include switching control apparatus 18 which operates a switch unit 19 to control the connection of a capacitor bank 20 to the associated feeder line.

The central station 16 includes carrier transmitting apparatus 21 which is coupled to the bus 14 by a power factor correcting capacitor 28 and a drain coil 29, sensing apparatus 22 which determines the needs of the power distribution system from information derived from the bus 14, and coding apparatus 23 which is initiated by the sensing apparatus and applies modulating signals to the transmitting apparatus 21 in a sequence determined by the load characteristics.

The sequence in which the coder 23 applies the modulating signals is determined by scanning apparatus 24 and selection apparatus 25 which are connected to a group of "off" tone generators 26 and a group of "on" tone generators 27. Tone transmission is coded to switch capacitor banks in a "last-on first-off" pattern. If, for example, the sensing apparatus 22 determines that more capacitors are needed on the feeder lines 15, it causes the selection apparatus 25 to connect the "on" tone generators 27 to the transmitting apparatus 21 through the scanning apparatus 24. Tones are applied from the "on" generators 27 until a sufficient number of the capacitors have been switched on the line to correct the load characteristic of the bus 14. The selection apparatus 25 then disconnects the "on" generators 27 and connects in the generators 26 so that "off" tones are sent out for the remainder of the sequence. Thus, each of the switching stations receives either an "on" or an "off" tone whether the associated capacitor is to be switched or not, and this maintains strict compliance with the desired sequence.

One of the switching stations 17 is shown in somewhat greater detail than the others to illustrate the connections for the various units thereof. The switching control apparatus 18 includes a control unit 31 which is plugged into a socket device 32 for making connections to the inductive antenna 36 and to the switch unit 19. The modulated carrier wave is inductively coupled by the antenna 36 through lines 35 to the control unit 31. Alternating current power is supplied through lines 33 to the control unit, and the switching output of the control unit is supplied through lines 34 to the switch 19. The use of a socket device and plug-in terminals permits easy installation and removal of the control unit, and this reduces installation and maintenance costs. The control unit is provided in a standard meter housing which can be interchanged with existing local regulator units so that the process of conversion to remote control is simplified and so that remote control may be mixed with local control if this is desired.

Figure 3:
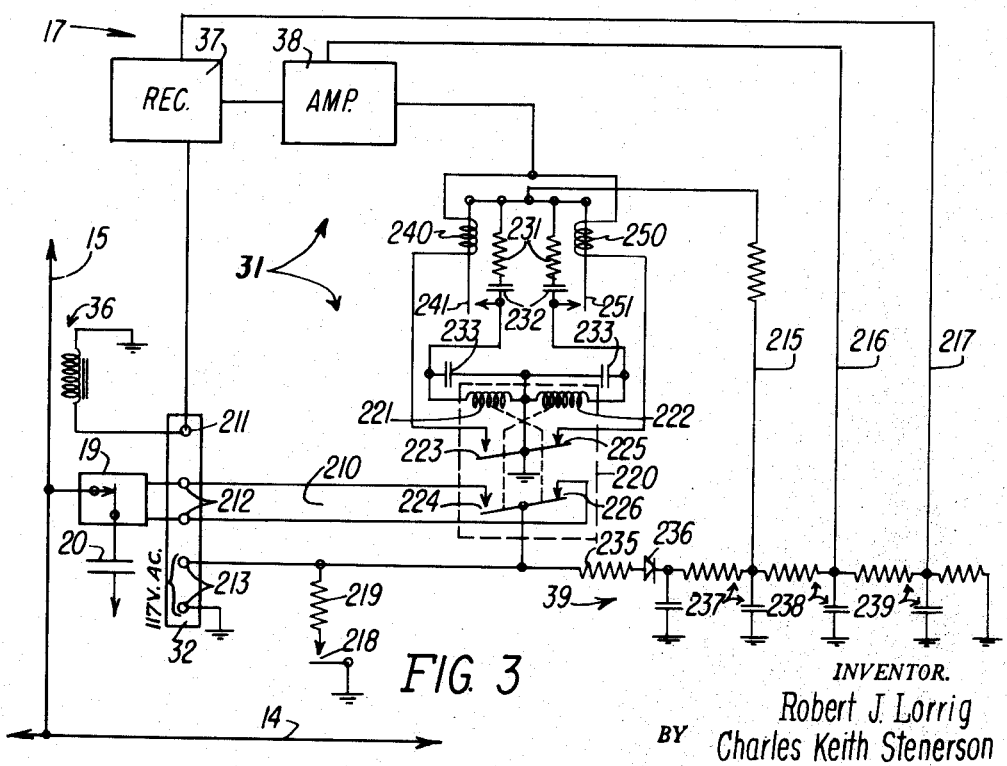
FIG. 3 is a circuit diagram for the apparatus provided at the switching stations of the system of FIG. 1.

The circuits for a specific embodiment of the invention are shown in FIGS. 2 and 3. The bus 14 which supplies power to the feeder lines 15 is shown in both figures, and in FIG. 3 one of the feeders 15 has a capacitor 20 and a switch unit 19 connected thereto at the switching station 17. A transistorized receiver 37 and amplifier 38 are provided in the control unit 31 of the switching station, but since the detailed circuits of these units are not considered to be important to the invention they will not be described in detail. For the same reason the transmitting apparatus 21 and the sensing unit 22 are shown schematically in FIG. 2.

The coding apparatus 23 of the central station includes two main parts, a frequency sequencing circuit 40 and a frequency controlling circuit 41. The frequency sequencing circuit 40 includes various control relays 100–190 and two stepping switches controlled by the actuators 80 and 90. The relays and actuators are designated by base numbers such as 100, 110, etc., and the numbers immediately following the base number such as 101–109 and 111–119 designate the contacts of the relays and stepping switches to facilitate identification. The frequency controlling circuit 41 includes one group of resonant-reeds 42 which provides "on" tones and another group of resonant-reeds 43 which provides "off" tones. The number of resonant-reeds which may be provided is flexible as will be explained, and in the embodiment illustrated there are twenty resonant reeds in each group. The reeds are illustrated in pairs which provide an "on" and an "off" tone for each of the capacitor banks, but only two pairs are shown specifically, the remainder being represented by the enclosure 44. The circuits for scanning and selecting between the two groups of resonant-reeds operate automatically when switch 61 is in the automatic position.

When switch 61 is moved to the manual position, any desired tone may be selected by manually controlling switch 62 whose contacts are connected individually to the various pairs of resonant-reeds. If the switch 63 is then operated to the "on" position, the "on" resonant-reeds 42 are grounded through contacts 64, and the selected reed is connected through switch 62 and contacts 67 to the transmitting assembly 21. Positive potential is applied through switch 61 and contacts 66 of switch 63 to a starting relay 180 which closes contacts in the oscillator of the transmitter 21 to condition the same for modulation. If the switch 63 is operated to the "off" position, the frequency controlling circuit 41 is completed from the transmitter 21 through contacts 68 of switch 63 and the switch 62 to the selected "off" resonant-reed which is grounded through normally closed contacts 65 of switch 63.

With switch 61 in the automatic position, the coder 23 is conditioned for operation in response to the indications of the sensing unit 22. The sensing unit is provided with contacts 52 which close when more capacitors are needed on the line and contacts 51 which close when fewer capacitors are needed.

Three important functions are performed by the frequency sequencing circuit 40. One is to control the order in which the tones are sent out, another is to control the selection between "on" and "off" tones within any one sequence and still another is to remember the numbers of "on" and "off" tones in the sequence from one operation to the next. The stepping switch associated with the actuator 80 controls the order of the tones, the relay 190 controls the selection between "on" and "off" tones, and the stepping switch associated with the actuator 90 performs the memory function.

The sequence stepping switch includes the actuator 80, contact levels 81–84, and the separate contacts 85–87. Each of the stepping switch levels 81–84 has twenty-six fixed contacts with the twenty-sixth contact being the "home" position. Since the illustrated embodiment is equipped to send only twenty tones in a given cycle, only twenty of the fixed contacts are used. Stepping switch level 81 controls the order in which tones are sent out when there is a need for some capacitors on the feeder lines of the power system, and stepping switch level 82 controls the order when less capacitors are needed. The fixed contacts of level 81 are connected to the various pairs of resonant-reeds in forward order, and the fixed contacts of level 82 are connected thereto in reverse order so as to control the connection of capacitors in the desired "last-on first-off" pattern. Contacts 192 and 193 of relay 190 ground either the "on" resonant-reeds 42 or the "off" resonant-reeds 43 depending upon whether relay 190 is operated or released. Stepping switch level 83 controls relay 190 and actuator 90, and level 84 speeds up the actuator 80 from position twenty-one to twenty-six as will be explained.

The memory stepping switch levels 91–94 step along with the sequence stepping switch levels 81–84 during the particular portion of the sending cycle when tones are being sent which will cause a change in the connection of capacitors. The memory stepping switch then stops when the sensing device 22 indicates that the needs of the power distribution system are satisfied. Thus, the position of the memory stepping switch after it stops provides an indication of the composition of the tone sequence from one sending cycle to the next. The memory stepping switch includes the actuator 90, and contact levels 91–94 inclusive each having twenty-five fixed contacts with the twenty-fifth contact being the "home" position. The memory stepping switch is a bi-directional rotary-type switch which has one coil 90–F for stepping its contact levels in a forward direction and another coil 90–R for stepping its contact levels in the reverse direction. Memory stepping switch levels 91 and 92 cooperate with sequence stepping switch level 83 to provide the memory function, level 93 lights up a lamp which provides a visible indication of the condition of the line capacitors, and level 94 provides an alarm function.

Sequencing of tones to switch capacitors on

The operation will be described starting from the condition where no capacitors are on the line and with contacts 52 of the sensing unit 22 closing to connect capacitors on the line. Relay 110 is energized through contacts 52 and normally closed contacts 86, and is held in through its own contacts 111. Contacts 112 of relay 110 close to activate relay 170, and this relay is slow operating to provide a time delay which will insure that the sensing contacts are positively closed before the operation proceeds. After the time delay which may be about thirty seconds, contacts 171 close to complete the energizing circuit through contacts 117 to relay 130. Relay 130 pulls in and closes contacts 132 to start the motor of the timer 71.

Each revolution or period provided by the timer 71 results in the generation of one tone except when the cycle is speeded up as will be explained later. The timer may rotate once every twenty seconds, and the timing contacts 72 close for about 2 seconds during each revolution. The closing of contacts 72 energizes an auxiliary relay 140, and once this relay is operated the cycle will go to completion. The auxiliary relay 140 ends the cycle just after the timing contacts 72 open. Thus, at the start of the next cycle the timer 71 will run for about eighteen seconds before relay 140 operates, and this provides a total delay of up to forty-eight seconds depending on the number of false starts.

The stepping pattern of actuator 80 is controlled by relays 140 and 150 during the portion of the cycle when tones are being sent out. Relay 150 is normally energized and is slow to release. Therefore, when relay 140 operates, actuator 80 is energized through contacts 142 and 151. Shortly after normally closed contacts 143 open, relay 150 releases, and its contacts 151 then open to deenergize actuator 80 and step the associated levels 81–84 to position one. Actuator 80 is pulsed in this manner once every twenty seconds until it reaches the twenty-first position. Since no tones will be sent from this point on, the self-drive level 84 is provided to speed up the remainder of the cycle. The fixed contacts at positions twenty-one to twenty-four of level 84 are bridged. Contact 85 in the self-drive circuit will open each time actuator 80 is energized, and this will break the self-drive circuit and deenergize actuator 80 stepping the associated contact levels to the next position. Thus, the stepping switches will advance to position twenty-five in a matter of milliseconds. This self-drive feature may be readily extended merely by bridging additional contacts in the event that fewer than twenty tone codes are utilized.

Referring back to the beginning of the sending cycle, the energization of relay 110 closes contacts 116 to light the "on" lamp which gives a visual indication that the equipment is operating to connect capacitors to the line. When relay 140 is first energized, a holding circuit for relay 130 is completed through contacts 141. Contacts 145 in the energizing circuit for relay 180 also close, and relay 180 operates to condition the oscillator of the transmitter 21 for modulation as previously explained. When actuator 80 first operates, contacts 87 in a branch of the holding circuit for relay 130 close and remain closed until the actuator steps through a complete cycle. Thus, relay 130 remains energized until the stepping switch levels 81–84 return to the home position.

"On" tones are applied to the transmitter 21 as the resonant reeds 42 are scanned by sequence stepping switch level 81. Relay 190 is energized through a circuit including contacts 144, 152, 161, the 26th contact of stepping switch level 83, and contact 136. When relay 190 operates, its contacts 193 close and connect the "on" resonant reeds 42 to ground through the normally closed contacts 65 of switch 63. Relay 190 is held in by its own contact 191 so that "on" tones continue to be sent out until the sensing device 22 detects that enough capacitors have been connected to the feeder lines. Then the sensing contacts 52 open dropping out relay 110 which then closes contacts 114, and this equalizes the potential across the energizing coil of relay 190 so that it deenergizes. Contacts 193 then open and contacts 192 close to disconnect the "on" resonant reeds 42 and connect the "off" resonant reeds 43 to ground so that "off" tones are sent out for the remainder of the sequence.

As previously mentioned, the memory stepping switch steps along with the sequence stepping switch during a portion of the scan. When relay 110 is operated by the sensing device 22, contacts 113 connect the forward stepping coil 90–F of actuator 90 to memory stepping switch level 91 whose fixed contacts are connected individually to the fixed contacts of sequence stepping switch level 83. When the auxiliary relay 140 operates, contacts 144 close and the energizing circuit for coil 90–F is then completed through a circuit including contacts 144, 152, 161, the 26th contact of stepping switch level 83, the 25th contact of stepping switch level 91, and contacts 113. The actuator 90 is forward-acting so the associated contact levels immediately step to position one. This breaks the energizing circuit for actuator 90 so it then releases. Stepping switch level 83 is moved to position one shortly thereafter, but contacts 152 are now open so the actuator 90 is not energized again until relay 140 is reoperated by the timer 71. The two stepping switches step together in this manner until the sensing contacts 52 open dropping out relay 110 which opens contacts 113 in the energizing circuit for actuator 90. Thus, memory switch levels 91–94 stop in the position corresponding to the last "on" tone in the tone sequence.

It may be noted that the two stepping switches and the relay 190 are arranged to compensate for certain possible sensing errors. Contact 86, which is connected in the energizing circuit for the two primary relays 100 and 110, is opened by actuator 80 as soon as it is energized and remains open until levels 81–84 reach the 26th position. This prevents the primary relays from being reenergized after the load has been corrected until the sending cycle has been completed, even if the sensing unit 22 should operate again before the end of the cycle.

If the sensing device 22 should operate falsely to initiate a sending cycle and then correct itself before any change in the connection of the capacitors is made, it is necessary for the cycle to be completed in accordance with the present condition of the capacitors in order to maintain the proper schedule. For instance, if ten capacitors have been connected onto the line in accordance with the previous description, the sensing device 22 may indicate that more capacitors are needed and then correct itself after the sequence stepping switch has started but before it reaches the 10th position. The coder does not switch over to "off" tones at this point because relay 190 remains energized keeping contacts 192 open. When sequence stepping switch level 83 reaches the 10th position it will match memory stepping switch level 91. Therefore, the next time relay 140 is operated and contacts 144 close, relay 190 will be deenergized by equalizing potential applied by contacts 114 and 135 to its energizing coil as previously explained. Contacts 192 will then close, and "off" tones will be sent out for the remainder of the cycle without changing the connections of the capacitors.

It is possible that the sensing device 22 will call for more "on" tones than the coder is equipped to provide. If so, the memory stepping switch levels 91–94 will have moved past position twenty to position twenty-one. The alarm relay 160 is connected through contacts 115 of relay 110 to the twenty-first contact of memory stepping switch level 94, and will be energized at this point in the cycle. Contacts 161 of relay 160 will open to stop the memory stepping switch in position twenty-one and contacts 162 will open to prevent the initiation of another sending cycle so long as the "alarm" condition exists. Contacts 165 will close to light the "alarm" lamp to give a visible indication of the situation.

Sequencing of tones to switch capacitors off

The operation of the coder 23 when the sensing device 22 detects a need to remove capacitors from the line will be explained starting from the condition that ten capacitors are on the line and with sensing contacts 51 closing to energize relay 100. After the time delay provided by relay 170, contacts 171 close to complete the energizing circuit through contacts 107 to relay 120. Relay 120 energizes and holds, closing contacts 122 to start the timer 71 which operates the stepping switch actuator 80 and the starting relay 180 as previously explained. Stepping switch levels 81–84 move to the first position. Level 82 is connected to the pairs of reeds in reverse order so that when it is in the first position, the "off" tone corresponding to the 20th reed is being sent out. The "off" reeds 43 are grounded through normally closed contacts 192 of relay 190 and normally closed contacts 65 of switch 63. Assuming that it is only necessary to disconnect one of the ten capacitors presently on the line, memory stepping switch levels 91–94 must end up in the ninth position to indicate that capacitor banks 1–9 remain on the line. This is accomplished by connecting together the contacts of levels 83 and 92 in reverse order as illustrated. When level 83 reaches position ten it matches level 92. An energizing circuit for the reverse stepping coil 90–R of actuator 90 is then completed through contacts 125, 161, the 10th contact of levels 83 and 92, and contacts 103. Coil 90–R is energized and steps levels 91–94 to position nine. When relay 100 drops out, contacts 103 open so that the memory stepping switch will remain in the ninth position. The release of relay 100 also closes contacts 104 so that an energizing circuit for relay 190 is completed as soon as level 83 reaches position eleven. Relay 190 energizes and holds through its own contacts 191, and contacts 193 close to connect the "on" resonant reeds to ground. Thus, "on" tones will be sent out for the remainder of the sequence.

It may be noted that if the sensing contact 51 opens prematurely and drops out relay 100 before stepping switch levels 81–85 reach the position corresponding to the last capacitor on the line, the switch from "off" to "on" tones will not take place prematurely. This is because relay 190, which controls the selection of the reeds, is not energized until the wiper of level 82 reaches the fixed contact which is connected to the fixed contact of level 92 at the position where the wiper thereof stopped after the last operation. Relay 190 then energizes immediately through contacts 104 and 126. Contact 103 is open, so actuator 90 is not energized and levels 91–94 merely remain where they are while levels 81–84 step through the rest of the sequence.

If the sensing device should call for more "off" tones than are equipped, the memory stepping switch level 94 will have moved in the reverse direction past position one to position twenty-five. Relay 160 will then be energized through contacts 105, and this will halt further sending cycles and light the "alarm" lamp as previously explained.

Switching station equipment

The control unit 31 (FIG. 3) operates the line switch 19 to control the connection of the capacitor bank 20 to the feeder line 15. The control unit 31 includes the receiver 37, the amplifier 38, two resonant-reed relays 240 and 250 which are selectively responsive to an "on" tone and an "off" tone respectively, and a switching control relay 220 which includes a coil 221 controlled by the "on" reed-relay 240 and a coil 222 controlled by the "off" reed-relay 250. Alternating current is supplied from terminals 213 of the socket device 32 to the switching output terminals 212, and the power supply circuit 39 provides direct current potential. A current limiting resistor 235 and a diode 236 rectify the alternating current from terminals 213. The filter 237 provides a direct current potential of about 135 volts which is applied by line 215 to the energizing circuits for the switching control relay 220. The filters 238 and 239 drop down the potentials which are applied by lines 216 and 217 to the amplifier 38 and the receiver 37. A wire wound resistor 219 heats the interior of the control unit 31, and the temperature is controlled by a thermostat 218.

As carrier signals come in over the feeder line 15, they are coupled to the receiver 37 by a loop antenna 36 including a coil which is wound on a ferrite core. The audio frequency modulation component of the carrier signal is detected by the receiver and amplified by the amplifier. The output audio control signals are applied to the two resonant-reed relays 240 and 250. The resonant-reeds 241 and 251 of these relays are connected in the energizing circuits for the two coils of switching control relay 220. The reeds make intermittent contact when relays 240 and 250 are energized, so the energizing current for the switching control relay tends to be a series of pulses. However, the resistors 231 and capacitors 232 and 233 make the energizing current continuous and also delay energization of the control relay 220 until the reed relays are positively operated.

Relay 220 is a "magnetic-latching" or "toggle" type. Contacts 224 and 226 of this relay are connected in the alternating current switching output circuit 210 which controls the connection of the capacitor 20 through the switch unit 19, and contacts 223 and 225 are connected in the energizing circuit for the coils of the reed relays 240 and 250. Switching control relay 220 is shown in the "on" position with contacts 225 and 226 closed. In this condition, the "off" reed relay 250 is selectively responsive to the output of amplifier 38, and the "on" reed relay 240 is open-circuited to positively prevent response to an "on" tone.

When an "off" tone of appropriate frequency is received, reed relay 250 is energized, and current is applied through the vibrating resonant-reed 251 to energize coil 222 of the control relay 220. Contacts 224 of relay 220 close to open the switch unit 19 and disconnect capacitor 20 from the line. Simultaneously, contacts 223 close and contacts 225 open to lock out the coil of the "off" reed relay 250 and to connect in the "on" reed relay 240. The next time an "on" tone is received, reed relay 240 is operated and coil 221 of relay 220 is now energized and returns contacts 223–226 to the original condition to connect the capacitor 20 back onto the feeder line and to condition the control unit for response to the next "off" tone.

The remote capacitor switching apparatus described above provides effective control over a large number of line capacitors and yet is quite inexpensive compared to tap-changing equipment and local control methods. Many safeguards are incorporated to assure reliable operation, and maintenance requirements are minimized. Relays and stepping switches are effectively coordinated so that a minimum of components and wiring is required, thus keeping down the cost of the equipment. The use of the remote control system permits locating the capacitors near customer loads where they are most effective, and the capacitors may be effectively controlled to make efficient use of generating facilities and reduce system losses.

We claim:

1. Automatic remote control apparatus for use in a power distribution system which includes transmission lines having a plurality of power factor correcting capacitors for connection thereto, and sensing apparatus responsive to a predetermined load characteristic of the transmission lines to indicate when more or less capacitors are needed on the lines; said remote control apparatus controlling the connection of such capacitors to the line and including in combination, a plurality of switching control stations each associated with a capacitor, and a central control station remotely located from said switching control stations, said central control station including carrier transmitting apparatus for supplying to the transmission lines a carrier wave modulated by control signals, and coding apparatus including frequency controlling means for providing sets of "on" and "off" control signals each of a different frequency, and sequence control circuit means including first and second stepping switch means for scanning in response to indications of the sensing apparatus to apply said control signals to said transmitting apparatus in a sequence determined by the load characteristics of the transmission lines, and means for causing said second stepping switch means to step along with said first stepping switch means during a portion of the scan thereof and stop in a position indicating the condition of the capacitors for remembering the sequence in which the capacitors are connected, and said switching control stations each including receiver means for deriving the control signals from the carrier wave received from said central station, and frequency selective control means responsive to control signals of predetermined frequencies to control the connection of the associated capacitor.

2. Automatic remote control apparatus for use in a power distribution system which includes transmission lines having a plurality of power factor correcting capacitors for connection thereto, and sensing apparatus responsive to a predetermined load characteristic of the transmission lines to indicate when more or less capacitors are needed on the lines; said remote control apparatus controlling the connection of such capacitors to the line and including in combination, a plurality of switching control stations each associated with a capacitor, and a central control station remotely located from said switching control stations, said central control station including carrier transmitting apparatus for supplying to the transmission lines a carrier wave modulated by control signals, and coding apparatus including frequency controlling means for providing sets of "on" and "off" control signals each of a different frequency, and sequence control circuit means including first and second stepping switch means for scanning in response to indications of the sensing apparatus to apply said control signals to said transmitting apparatus in a sequence determined by the load characteristic of the transmission lines, said second stepping switch means stopping at a position to indicate the condition of the capacitors, and relay means operated by said stepping switch means independently of the sensing apparatus to maintain a desired sequence of said control signals in the event that the indication of said sensing apparatus is incorrect, and said switching control stations each including receiver means for deriving the control signals from the carrier wave received from said central control station, frequency selective means for controlling the connection of the capacitors to the line in response to selected "on" and "off" control signals, said frequency selective means including relay means operating to prevent successive response to control signals of the same frequency for assuring compliance to the sequence in which the control signals are transmitted.

3. Automatic remote control apparatus for use in a power distribution system which includes a distribution station for applying power to the transmission line, and which system includes a plurality of power factor correcting capacitors for connection to the transmission lines and sensing apparatus at the distribution station responsive to a predetermined load characteristic of the transmission lines to indicate when more or less capacitors are needed on the line; said remote control apparatus controlling the connection of such capacitors to the lines and including in combination, a plurality of switching control stations each associated with a capacitor, and a central control station associated with a distribution station, said central control station including carrier transmitting apparatus for supplying to the transmission lines a carrier wave modulated by control signals, and coding apparatus responsive to the sensing apparatus for selectively applying control signals of different frequencies to said transmitting apparatus for modulating the carrier wave in a controlled sequence, said coding apparatus including first and second groups of resonant-reeds for controlling the frequencies of the modulating signals, first and second stepping switch means for scanning through either of said groups of resonant-reeds in forward and reverse order, with said second stepping switch stopping at a position to indicate the condition of the capacitors, and selection means for selecting modulating signals from one of said first and second groups of resonant-reeds in response to a corresponding indication of the sensing apparatus, and said switching control stations each including receiver means for deriving the control signals from the carrier wave received from said central control station, first and second resonant-reed relays selectively energized by predetermined control signals, an alternating current output circuit, and a direct current switching control circuit including a toggle relay, said resonant-reed relays each having reed contacts connected to said toggle relay for controlling the energization thereof, and said toggle relay having first contacts connected to said resonant-reed relays for selectively controlling the energization thereof and having second contacts in said output circuit for controlling the connection of the capacitor to the transmission line.

4. Automatic remote control apparatus for use in a power distribution system which includes a power distribution station for supplying power to transmission lines, and which system includes a plurality of power factor correcting capacitors for connection to the transmission lines and sensing apparatus at the power distribution station responsive to a predetermined load characteristic of the transmission lines to indicate when more or less capacitors are needed on the lines; said remote control apparatus controlling the connection of such capacitors to the lines and including in combination, a plurality of switching control stations each associated with a capacitor, and a central control station associated with the power distribution station, said central control station including modulated carrier transmitting apparatus for supplying to the transmission line a carrier wave modulated by control signals, and coding apparatus including frequency controlling means for providing sets of "on" and "off" control signals each of a different frequency, and sequence control circuit means including first stepping switch means having first contact levels for making connections to said frequency controlling means in a controlled sequence, said first stepping switch means having second contact levels for memory operation, second stepping switch means having contact levels connected to said second contact levels of said first stepping switch means, said second stepping switch means stepping along with said first stepping switch means during a portion of the scan thereof and stopping in a position indicating the connection of the capacitors, and control relay means for selecting said control signals in response to a corresponding indication of the sensing apparatus, whereby the carrier wave is modulated by "on" and "off" control signals in a sequence determined by the load characteristic, and said switching control stations each having a control unit including carrier receiver means for deriving the control signals from the carrier wave received from said central control station, and frequency selective means for controlling the connection of the capacitors to the line in response to said "on" and "off" control signals.

5. Automatic remote control apparatus for use in a power distribution system to control the connection of capacitors to the transmission lines of the system in response to sensing apparatus, said remote control apparatus including in combination, carrier transmitting apparatus to be located at a central station for supplying to the transmission lines a carrier wave modulated by control signals, coding apparatus including frequency controlling means for providing sets of "on" and "off" modulating signals each of a different frequency, and sequence control circuit means including first and second stepping switch means for scanning in response to indications of the sensing apparatus to apply said control signals to said transmitting apparatus in a sequence determined by a load characteristic of the transmission lines, and means for causing said second stepping switch means to step along with said first stepping switch means during a portion of the scan thereof and stop in a position indicating the condition of the capacitors for remembering the sequence in which the capacitors are connected from one operation to the next.

6. Automatic remote control apparatus for use in a power distribution system to control the connection of capacitors to the transmission lines of the system in response to sensing apparatus which is sensitive to a predetermined load characteristic of the lines, said remote control apparatus including in combination, carrier transmitting apparatus at a central station for supplying to the transmission lines a carrier wave modulated by control signals, coding apparatus responsive to the sensing apparatus for selectively applying control signals of different frequencies to said transmitting apparatus for modulating the carrier wave in a controlled sequence, said coding apparatus including first and second groups of resonant-reeds for controlling the frequency of the modulating signals, first and second stepping switch means for scanning through either of said groups of resonant-reeds in forward and reverse order, said first and second stepping switch means having contact levels connected together and including movable contacts which step together during a portion of the scan, with the movable contacts of said second stepping switch means stopping and remaining at a position to indicate the condition of the capacitors, and selection means for selecting modulating signals from said first and second groups of resonant-reeds in response to corresponding indications of the sensing apparatus, whereby the sequence of said control signals is determined by the predetermined load characteristic of the transmission lines.

7. Automatic remote control apparatus for use in a power distribution system to control the connection of capacitors to the transmission lines of the system in response to sensing apparatus, said remote control apparatus including in combination, modulated carrier transmitting apparatus to be located at a central control station for supplying to the transmission lines a carrier wave modulated by control signals, coding apparatus including first and second frequency controlling means for respectively providing sets of "on" and "off" modulating signals each of a different frequency, and sequence control circuit means including first stepping switch means having first contact levels for scanning through the modulating signals from said frequency controlling means in a controlled sequence, said first stepping switch means having a second contact level for memory operation, second stepping switch means having contact levels connected respectively to said second contact level of said first stepping switch means, and means for causing said second stepping switch means to step along with said first stepping switch means during a portion of the scan thereof and stop in a position indicating the connection of the capacitors, and selection means for selecting modulating signals from said first and second frequency controlling means in response to a corresponding indication of said sensing apparatus and for selecting modulating signals from the other one of the same when the load has been corrected, said selection means including a relay operated independently of the sensing apparatus in the event the same prematurely indicates that the load has been corrected for delaying the transition between the "on" and "off" modulating signals to maintain a desired sequence.

8. Automatic remote control apparatus for use in a power distribution system to control the connection of capacitors to the transmission lines of the system in response to sensing apparatus which is sensitive to a predetermined load characteristic of the lines, said remote control apparatus including in combination, carrier transmitting apparatus at a central station for supplying to the transmission lines a carrier wave modulated by control signals, coding apparatus responsive to the sensing apparatus for selectively applying control signals of different frequencies to said transmitting apparatus for modulating the carrier wave in a controlled sequence, said coding apparatus including first and second groups of resonant-reeds for controlling the frequency of the modulating signals, first and second stepping switch means for scanning through either of said groups of resonant-reeds in forward and reverse order, said first and second stepping switch means having contact levels connected together and including movable contacts which step together during a portion of the scan, with the movable contacts of said second stepping switch means stopping and remaining at a position to indicate the condition of the capacitors, selection means for selecting modulating signals from said first and second groups of resonant-reeds in response to corresponding indications of the sensing apparatus, whereby the sequence of said control signals is determined by the predetermined load characteristic of the transmission lines, and control means operated by said second stepping switch means in the event the load characteristic cannot be corrected by said apparatus to prevent repeated cycling thereof.

References Cited in the file of this patent

UNITED STATES PATENTS

| | | |
|---|---|---|
| 2,255,162 | Hart | Sept. 9, 1941 |
| 2,484,575 | Livingston | Oct. 11, 1949 |
| 2,550,506 | Wasson et al. | Apr. 24, 1951 |
| 2,630,482 | Bostwick | Mar. 3, 1953 |